UNITED STATES PATENT OFFICE.

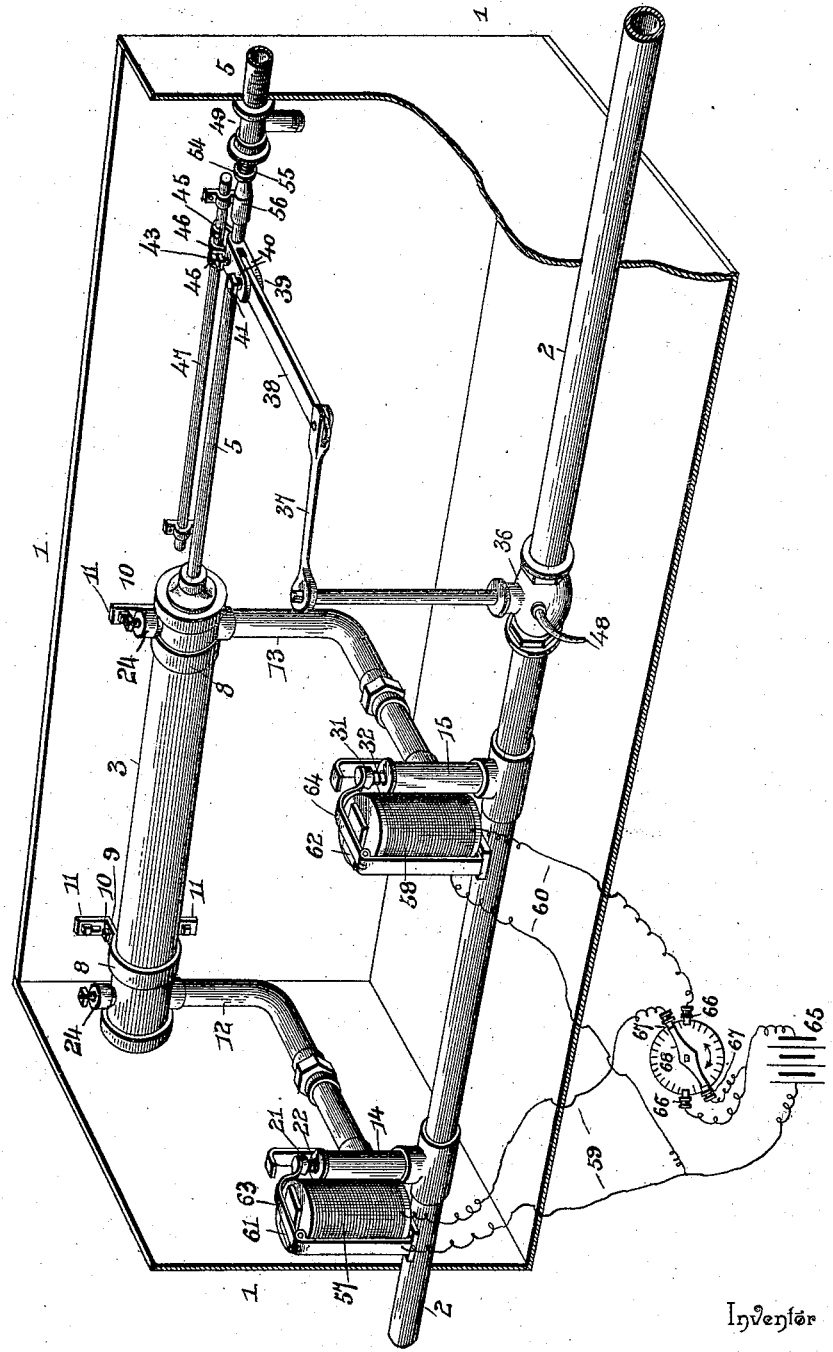
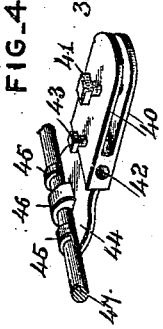

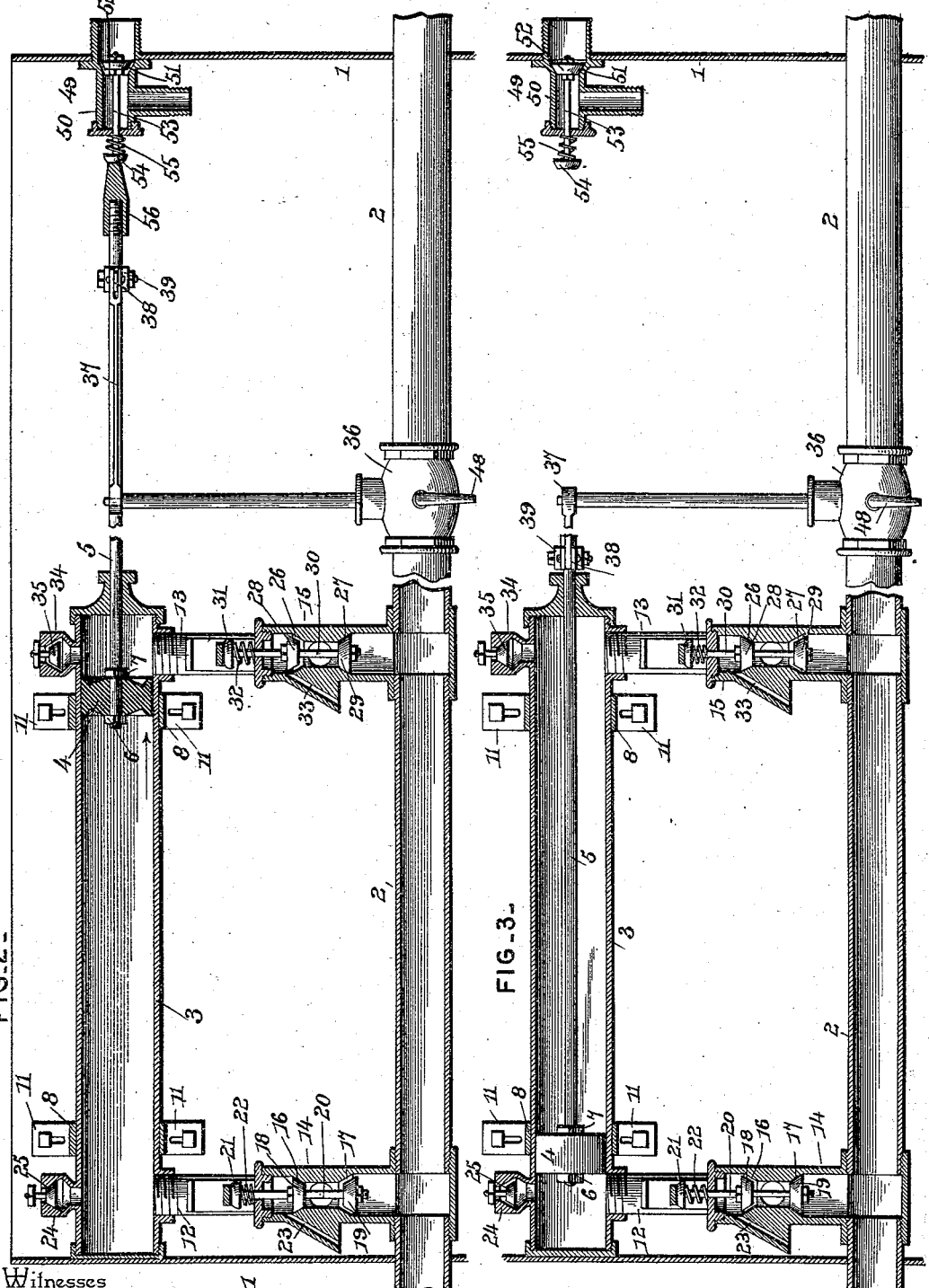

WILLIAM M. WILLIAMS, OF OPELIKA, ALABAMA, ASSIGNOR OF TWO-THIRDS TO H. C. JERMIGAN AND GEORGE E. DRIVER, OF SAME PLACE.

AUTOMATIC CUT-OFF MECHANISM.

SPECIFICATION forming part of Letters Patent No. 548,733, dated October 29, 1895.

Application filed June 8, 1895. Serial No. 552,158. (No model.)

*To all whom it may concern:*

Be it known that I, WILLIAM M. WILLIAMS, a citizen of the United States, residing at Opelika, in the county of Lee and State of Alabama, have invented a new and useful Automatic Cut-Off Mechanism, of which the following is a specification.

My invention relates to a cut-off mechanism for controlling water supply and distributing systems, the object in view being to provide means for automatically cutting off the supply of water and draining the distributing-pipes when the temperature falls to a degree approaching the freezing-point and for automatically turning on the supply when the temperature rises above the point of danger.

Further objects and advantages of this invention will appear in the following description, and the novel features thereof will be particularly pointed out in the appended claims.

In the drawings, Figure 1 is a perspective view of a cut-off mechanism constructed in accordance with my invention, the parts being shown in the positions which they assume when the water-supply is cut-off. Fig. 2 is a side view of the same, showing the cylinder and the supply-pipe in section, the parts being in the same position as in Fig. 1. Fig. 3 is a similar view showing the parts in the positions which they assume when the water is turned on. Fig. 4 is a detail view of the guide for the piston-rod.

Similar numerals of reference indicate corresponding parts in all the figures of the drawings.

1 designates a casing in which the automatic cut-off mechanism embodying my invention is inclosed, 2 being a section of a supply-pipe which extends through the casing and is adapted to be arranged in communication with the main water-supply pipes of a distributing system.

Arranged in the cylinder 3 is a piston-head 4, to which is connected a piston-rod 5, nuts 6 and 7 being threaded upon a piston-rod upon opposite sides of the piston-head, and the piston-head being of compressible material, as rubber, to provide for expanding the same laterally by the adjustment of the nut to fit snugly in the cylinder. The cylinder is secured to the wall of the casing by means of clamps 8, of which the sides 9 are connected by an adjusting-screw 10 to provide for contraction and expansion to fit the cylinder. Said sides of the clamps terminate in ears 11, having slots through which bolts extend for attachment to the casing. The cylinder communicates near its opposite ends with the supply-pipe by means of branch pipes 12 and 13. Interposed between the branch pipes and the supply-pipe are valve-casings 14 and 15, the valve-casing 14 being provided with upper and lower valve-seats 16 and 17, adapted to receive the upper and lower valves 18 and 19, connected by a stem 20. The upper end of this stem is provided with a head or pressure button 21, below which is arranged a return-spring 22, which is adapted to normally hold the stem elevated and the valve-head 19 seated. The seating of the valve 19 closes communication between the supply-pipe and the end of the cylinder with which the branch pipe 12 is connected and at the same time by reason of unseating the valve 18 establishes communication between the branch pipe 12 and a vent 23, which is formed in the valve-casing and is designed to serve as a drain for the contents of that end of the cylinder to which said branch pipe is connected.

In order to supply air to the interior of the cylinder during the draining operation, I employ an air-inlet tube 24, controlled by an air-inlet valve 25. When the valve-stem is depressed, as illustrated in Fig. 2, to seat the valve 18 and unseat the valve 19, communication is established between the supply-pipe and the end of the cylinder with which the branch pipe is connected, thereby forcing the piston in the direction indicated by the arrow in said Fig. 2. The pressure of the water within the cylinder closes the air-inlet valve 25.

The casing 15 incloses a valve mechanism similar to that above described, including upper and lower seats 26 and 27, upper and lower valves 28 and 29, connected by a stem 30, which extends above the upper end of the casing and is fitted with a head or button 31, and a spring 32 being arranged between said head or button and the upper end of the casing to elevate the valve-stem and seat the lower valve when released. A vent 33 communicates with the interior of the casing above the upper valve to drain the end of the cylinder with which the branch pipe 13 is connected when the valve-stem is elevated and the upper valve unseated, and it is obvious that when the valve-stem is depressed to unseat the lower valve the water in the supply-pipe will pass through the branch pipe to the cylinder, and thereby return the piston from the position shown in Fig. 2 to that shown in Fig. 3. An air-inlet tube 34 communicates with the end of the cylinder contiguous to the branch pipe 13 and is fitted with an air-inlet valve 35, which operates similarly to that above described, which is arranged at the other end of the cylinder.

The supply-pipe cut-off valve 36, which may be of the ordinary or any preferred construction, is provided with an operating-arm 37, to which is connected the piston-rod 5 by means of a link 38, a clamp 39 being employed to form the connection between the link and the rod. Said clamp, which is shown in detail in Fig. 4, is provided with parallel ears 40, between which the extremity of the link is pivoted upon a pin 41, and extending transversely through the clamp is an opening 42, in which is fitted the piston-rod, a set-screw 43 being arranged in an opening 42 to impinge against the rod and secure the clamp at the desired point thereof. This clamp is extended to form a guide 44, having oppositely-bent fingers 45 and 46, mounted to slide upon a guide-rod 47, which is arranged in the casing parallel with the piston-rod.

When the valve mechanism in the casing 15 is arranged in the position shown in Fig. 2 to open communication between the branch pipe and the vent, the admission of water at the opposite end of the cylinder causes the movement of the piston in the direction indicated by the arrow in Fig. 2, and this movement, communicated to the arm 37, closes the water-cut-off valve 36 and prevents the flow of water through the supply-pipe. This valve 36 is constructed similar to those in ordinary use with a drain 48, which is opened to communicate with the portion of the pipe beyond the cut-off valve when the cut-off valve is closed. Arranged in the path of the extremity of the piston-rod is a hot-water drain 49, adapted to communicate with the hot-water pipes, boiler, &c., said drain having a casing 50, provided with a valve-seat 51, to receive the valve 52. This valve is provided with a stem 53, terminating at its outer end in the path of the extremity of the piston-rod with a head or button 54, and a spring 55 is connected to the stem to normally hold the valve closed. Hence, when the piston-rod is extended to close the cut-off valve 36 and thereby open the drain 48, which is in communication with the cold-water-distributing pipes of a building, the extremity of said piston-rod represses the stem 53 and thereby opens communication between the hot-water-distributing pipes and the drain 49. Fitted upon the extremity of the piston-rod 5 is an adjustable tip 56 which, in the construction illustrated, is threaded upon the rod to provide for adjustment parallel with the axis of the cylinder to repress the valve 52 the desired distance.

The means which I employ for operating the valve-stems 20 and 30 include electromagnets 57 and 58 arranged, respectively, in the circuits 59 and 60, and are provided with armatures 61 and 62, having arms 63 and 64 to bear, respectively, upon the heads or buttons 21 and 31. The circuits 59 and 60 may be energized by a common battery 65, and the circuits are provided with terminals or contact-points 66 and 67. 68 represents a circuit-controller which is adapted to complete the circuit 59 by engagement with the contacts 67, or complete the circuit 60 by engagement with the contact-points 66.

The circuit-controller is connected with a thermometer, thermoscope, or other heat-indicating device, and it is so arranged with relation thereto that it is moved into engagement with the contact-points 67 when the temperature falls to a degree near the freezing-point. The current energizes the magnet 57, and, therefore, causes the depression of the valve-stem 20, and the opening of communication between the supply-pipe, the branch-pipe 12 and the contiguous end of the cylinder, hence closing the cut-off valve 36 and opening the hot-water drain 49. When the temperature rises sufficiently to remove the circuit-controller from engagement with the contact-points 67 and thereby break the current through the circuit 59, the spring 22 elevates the valve-stem 20, closes communication between the supply-pipe and the branch pipe 12, and opens communication between the branch pipe and the vent 23, whereby the water drains from the end of the cylinder, the air-inlet valve 25 opening to admit air to the cylinder. When the temperature rises still farther and thus reaches a point of safety, the circuit-controller engages the contact-points 66, thereby energizing the electromagnet 58 and causing the depression of the valve-stem 30, and hence the opening of the communication between the supply-pipe, the branch pipe 13, and the connected end of the cylinder. This causes the backward movement of the piston to the position shown in Fig. 2, and hence the opening of the main cut-off valve 36. When the circuit-controller passes beyond the contact-points 66 by a still further increase of temperature, the valve-stem 30 is returned to its normal position by means of the return-spring, thereby closing communication between the supply-pipe and the branch pipe 13, and opening communication between the contiguous end of the cylinder and the vent for the valve-casing 15. The valve 35 also opens to admit the air to the cylinder necessary to allow the same to drain.

From the above description it will be seen that the water-supply is cut off when the temperature falls nearly to freezing-point and is turned on when the temperature rises to a point of safety, and while the system of connections between the electromagnets and the battery and including the switch or circuit controlling mechanism is simple and effective, as above described, it is obvious that in this as in other parts of the mechanism various changes in the form, proportion, and the minor details of construction may be resorted to without departing from the spirit or sacrificing any of the advantages of this invention.

Having described my invention, what I claim is—

1. The combination with a supply-pipe, of communicating valve casings, having spaced seats, double valves to fit said seats, a cylinder arranged above the plane of the valve casings and connected at opposite ends thereto by interposed pipes, said double valves being adapted to control the passages from the supply pipe to the cylinder and from the cylinder to vent openings in the valve casings, the said pipes tapping the casings between the valve seats, a piston operating in the cylinder and connected to a cut-off valve in the supply-pipe, air-inlet valves in the cylinder, and means actuated by thermal variations for controlling the valves, substantially as described.

2. The combination of a supply-pipe, a cylinder in communication at opposite ends with the supply-pipe, a piston operating in the cylinder, a cut-off valve for the supply-pipe operatively connected with the piston-rod, a drain-valve stem arranged in the path of and adapted to be actuated by the piston-rod, valves for controlling the admission of fluid into the cylinder upon opposite sides of the plane of the piston-head, and means controlled by thermal variations for actuating said controlling valves, substantially as specified.

3. The combination of a supply-pipe, a cylinder in communication at opposite ends with the supply-pipe, a piston operating in the cylinder, a drain-valve stem arranged in the path of the piston-rod, a tip adjustably mounted upon the piston-rod to engage and operate the drain-valve stem, a cut-off valve for the supply-pipe operatively connected with the piston-rod, valves for controlling the admission of fluid to the cylinder upon opposite sides of the plane of the piston-head, and means actuated by thermal variations for operating the controlling valves, substantially as specified.

4. The combination of a supply-pipe, a cylinder connected at its extremities with the supply-pipe, a piston operating in the cylinder, a cut-off valve for the supply-pipe, a guide-rod arranged parallel with the path of the piston-rod, a clamp adjustably secured to the piston-rod and provided with a guide engaging and adapted to slide upon the guide-rod, connections between said clamp and the cut-off valve, valves for controlling the admission of fluid to the cylinder upon opposite sides of the plane of the piston-head, and means controlled by thermal variations for actuating the controlling valves, substantially as specified.

5. The combination with a supply-pipe, a cut-off valve for the supply-pipe, a cylinder communicating at its extremities with the supply-pipe, and a piston operating in the cylinder and operatively connected with the cut-off valve, of valves for controlling the admission of fluid to the cylinder upon opposite sides of the plane of the piston-head, said valves also controlling vents for draining the cylinder, return springs for actuating the valves to open the vents, valve-controlled air inlets for the cylinder, and means controlled by thermal variations for actuating the valves to admit fluid to the cylinder, substantially as specified.

6. The combination with a supply-pipe, a cut-off valve for the supply-pipe, a cylinder communicating at its extremities with the supply-pipe, and a piston operating in the cylinder and operatively connected with the cut-off valve, of double valves adapted to fit opposite valve-seats respectively controlling the admission of fluid to the cylinder upon opposite sides of the plane of the piston-head and vents for draining the same, springs for normally holding the valves in position to cut off the admission of fluid to the cylinder and open the draining vents, electro-magnets arranged in different circuits and having their armatures provided with arms for engaging the stems of the double valves, respectively, and a circuit closer controlled by thermal variations for closing either circuit, substantially as specified.

In testimony that I claim the foregoing as my own I have hereto affixed my signature in the presence of two witnesses.

WILLIAM M. WILLIAMS.

Witnesses:
JOHN H. SIGGERS,
HAROLD H. SIMMS.